United States Patent [19]

Assard

[11] 4,386,913
[45] Jun. 7, 1983

[54] PSEUDO-RANDOM NOISE GENERATED TARGET SIMULATOR

[75] Inventor: Gerald L. Assard, Waterford, Conn.

[73] Assignee: The United States of America as represented by the Secretary of the Navy, Washington, D.C.

[21] Appl. No.: 266,852

[22] Filed: May 26, 1981

[51] Int. Cl.³ .............................................. G01S 7/52
[52] U.S. Cl. ........................................... 434/9; 367/1; 367/137
[58] Field of Search ...................... 434/6, 8, 9; 367/1, 367/138, 137

[56] References Cited

U.S. PATENT DOCUMENTS

| | | | |
|---|---|---|---|
| 2,910,586 | 10/1959 | Kohler | 367/138 |
| 3,700,780 | 10/1972 | Roeschlein | 434/9 |
| 3,916,533 | 11/1975 | Kijesky | 434/9 |
| 4,049,953 | 9/1977 | Evans, Jr. | 367/137 X |

Primary Examiner—Richard A. Farley
Attorney, Agent, or Firm—Robert F. Beers; Arthur A. McGill; Prithvi C. Lall

[57] ABSTRACT

A target simulator tests the characteristics of a multi-element array without the use of large memories and long delay line storage. The simulator includes a master clock which provides the count frequency to a binary counter. The reading of the binary counter is compared in a comparator with a stored number in a sequence from a programmable readable memory (PROM). On agreement the comparator feeds an output to an appropriate member of a group of hydrophone counters. Upon receipt of the signal from the comparator the counter provides a signal to the PROM. The PROM then provides its next synchronizing binary number to the comparator. The hydrophone counter also provides a signal to the channel selector reset which resets an appropriate pseudo-random noise generator (PRNG) to produce an output of the target simulator.

3 Claims, 2 Drawing Figures

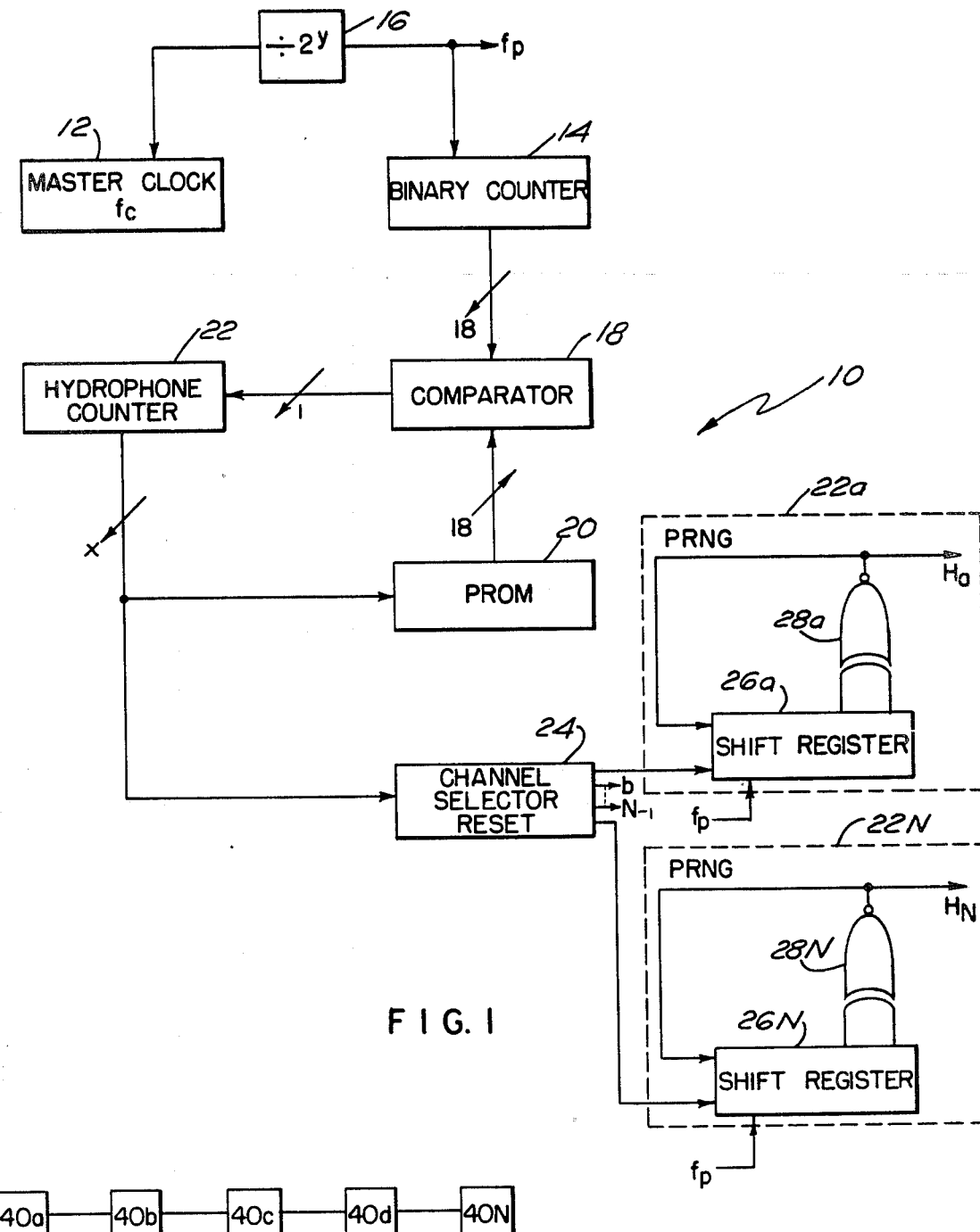
F I G. 1
F I G. 2

PSEUDO-RANDOM NOISE GENERATED TARGET SIMULATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

Multi-element arrays are employed to improve signal-to-noise, and to obtain bearing and range of either near field or far field targets. The acoustic signals of the multi-element array are normally summed into a beamformer. A simple broadside beamformer may only sum the elements, while a more complex beamformer will consist of multibeam, steered and shaded networks. A good practice is to frequently run simulated targets through the beamformer to test the complex circuitry.

(2) Description of the Prior Art

The method normally employed requires lengthy memory or delay line storage to develop the synthesized wave fronts. The length of memory storage maximizes when simulating acoustic signals from an end fired array. Long arrays require large memories or long delay lines. The large memory approach can be easily addressed to present the wave fronts for both near and far field targets. However, the delay line approach is not as easily manipulated where it is necessary to change from the near field spherical wave front to the far field plane wave front.

SUMMARY OF THE INVENTION

The pseudo-random noise generated target simulator (PRNGTS) replaces the large memories and long delay lines with a plurality of pseudo-random noise generators that are programmed to have a noise sequence with a period much longer than the arrays end fire travel time requirements. When required, the PRNGTS wave fronts are easily manipulated to present a moving target by employing a random access memory (RAM) for the single synchronizing binary number PROM.

BRIEF DESCRIPTION OF THE DRAWINGS

FIG. 1 is a diagram of a pseudo-random noise generated target simulator in accordance with the present invention; and FIG. 2 depicts the actual conditions that are being simulated by the target simulator of FIG. 1.

DESCRIPTION OF THE PREFERRED EMBODIMENT

Referring now to FIG. 1 there is shown a pseudo-random noise generated target simulator 10. The simulator 10 comprises conventional logic building blocks driven by a master clock $f_c$ 12. The master clock 12 presents the count frequency to the divider 16. The steps between counts $\Delta t = 1/f_c$ provides the delay by incrementally increasing the divider 16 through its $2^y$ stable states. The divider 16 provides a pulsing signal to advance binary counter 14 one count when the divider 16 reads all 0's. This represents one count to the binary counter 14 for every $2^y$ counts from master clock $f_c$ 12. The binary counter 14 has eighteen bits and presents a binary number to a comparator 18 over eighteen interconnecting lines. The programmable readable memory 20 contains a unique synchronizing binary number for each of N pseudo-random noise generators 22a-N. The permutation must be presented as a set of increasing binary numbers. The PROM 20 also presents its binary number to the comparator 18 over eighteen interconnecting lines. When the count on binary counter 14 equals the stored PROM 20 number, the comparator 18 presents a pulse to the hydrophone counter 22. The hydrophone counter 22 increases by one count providing a new address over X lines to the PROM 20 which presents the next synchronizing binary number to comparator 18. The hydrophone counter 22 provides the same new address to the channel selector reset 24. The channel selector reset 24 provides a reset signal to PRNG 22a which synchronizes PRNG 22a by resetting it to all zeroes. PRNG 22a is comprised of a shift register 26a and an EXCLUSIVE-NOR circuit 28a. PRNG 22a is clocked at the required nyquist frequency $f_p$ of the system from divider 16. The nyquist frequencies are obtained by dividing down $f_c$ by $2^y$. The $2^y$ divider 16 provides synchronization to the reset 24 to maintain an increment of delay of $1/f_p$ if the PROM 20 has a numerical sequence of one unit.

Blocks 22a-N comprise conventional PRNG circuitry with shift register circuitry 26a-N which has a reset capability and feedback on two of its outputs to generate the pseudo-random count sequence through EXCLUSIVE-NOR circuitry 28a-N. The serial binary bit stream $H_{a-N}$ is extracted from the EXCLUSIVE-NOR 28a-N feedback. This $H_a$ bit stream is provided to simulate a wave front of a broadband target as seen on a hydrophone of the array.

Following the activation of PRNG 22a the comparator 18 is looking for the next binary count that agrees with the count stored in PROM 20. If the count in PROM 20 is sequential in unity steps this comparison will be reached on each pulse from the $2^y$ divider 16. This will force a reset of the next sequential PRNG. As can be seen the above procedure results in the PRNG's 22a-N being recycled sequentially on each pulse from the $2^y$ divider 16.

To simplify the explanation of the PRNG's 22a-N only the three least significant bits instead of the actual 18 bits are shown for shift register 22a in Table 1. Then the sequence on reset would be as follows:

TABLE 1

| $2^2$ | $2^1$ | $2^0$ | decimal equivalent |
|---|---|---|---|
| 0 | 0 | 0 | 0 |
| 0 | 0 | 1 | 1 |
| 0 | 1 | 1 | 3 |
| 1 | 1 | 0 | 6 |
| 1 | 0 | 1 | 5 |
| 0 | 1 | 0 | 2 |
| 1 | 0 | 0 | 4 |
| 0 | 0 | 0 | 0 |

The $2^0$ column is the feedback that would be presented as $H_a$.

The sequence of the output from all PRNG's 22a-N as shown in Table 2 if $H_N$ were the fifth PRNG.

TABLE 2

| $H_a$ | $H_b$ | $H_c$ | $H_d$ | $H_N$ |
|---|---|---|---|---|
| 0 | 0 | 0 | 1 | 0 |
| 1 | 0 | 0 | 0 | 1 |
| 1 | 1 | 0 | 0 | 0 |
| 0 | 1 | 1 | 0 | 0 |
| 1 | 0 | 1 | 1 | 0 |

TABLE 2-continued

| $H_a$ | $H_b$ | $H_c$ | $H_d$ | $H_N$ |
|---|---|---|---|---|
| 0 | 1 | 0 | 1 | 1 |
| 0 | 0 | 1 | 0 | 1 |

These cycles would then continually repeat. As can be seen each H output is identical to the preceding H output but delayed by one count. This simulates an advancing wave front as detected by line array hydrophones as in FIG. 2.

FIG. 2 shows a plurality of hydrophones 40a, 40b, 40c, 40d and 40N in the path of wave front 42. As can be seen hydrophone 40a receives a signal from the wave front 42 first and the signal is then sequentially received by 40b, 40c, 40d and 40N. This is exactly the manner in which the signals $H_{a-N}$ are emitted.

There has therefore been described a pseudo-random noise generated target sinulator that synthesizes a single broadband target into a multi-element beamformer. The synthesized wave front maintains the required delays.

It will be understood that various changes in the details, material, steps and arrangement of parts, which have been herein described and illustrated in order to explain the nature of the invention, may be made by those skilled in the art within the principle and scope of the invention as expressed in the appended claims.

I claim:

1. A pseudo-random noise target simulator comprising:

programming means including clocking means for providing timing pulses, a binary counter connected to said clocking means and advancing one count upon receipt of each timing pulse, a programmable readable memory for storing and providing predetermined counts, comparator means connected to receive inputs from said counter and said programmable readable memory and for providing an output signal when the received inputs are identical, and hydrophone counting means for updating said programmable readable memory and reset means upon receipt of the output signal from said comparator;

reset means connected to said programming means for cyclicly providing individual output signals on a plurality of outputs in response to the receipt of the independent signals from said programming means; and pseudo-random noise generating means for synthesizing an acoustic wave front as detected by a line array in response to receiving said cyclicly provided individual output signals, said pseudo-random noise generating means includes a plurality of pseudo-random noise generators that generate individual output signals forming said wave front.

2. A pseudo-random noise target simulator according to claim 1 wherein said reset means includes a channel selector reset having a plurality of outputs that are excited from a predetermined permutation.

3. A pseudo-random noise target simulator according to claim 2 wherein said pseudo-random noise generating means further provides a simulated broadband wave front for an N element array.

* * * * *